US008638824B2

(12) United States Patent
Gardelle et al.

(10) Patent No.: US 8,638,824 B2
(45) Date of Patent: Jan. 28, 2014

(54) HIGH-EFFICIENCY METHOD AND DEVICE, TO PRODUCE COHERENT SMITH-PURCELL RADIATION

(71) Applicant: Commissariat a l'Energie Atomique et aux Energies Alternatives, Paris (FR)

(72) Inventors: Jacques Gardelle, Pessac (FR); John-Thomas Donohue, Gradignan (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 13/633,750

(22) Filed: Oct. 2, 2012

(65) Prior Publication Data

US 2013/0083811 A1     Apr. 4, 2013

(30) Foreign Application Priority Data

Oct. 3, 2011   (FR) ...................... 11 58907

(51) Int. Cl.
*H01S 3/00*     (2006.01)
(52) U.S. Cl.
USPC ................. 372/2; 372/1; 372/50.11; 372/102
(58) Field of Classification Search
USPC .............................................. 372/1–2, 50.11
See application file for complete search history.

(56) References Cited

U.S. PATENT DOCUMENTS

| 7,626,179 B2* | 12/2009 | Gorrell et al. | 250/396 R |
|---|---|---|---|
| 2006/0062258 A1 | 3/2006 | Brau et al. | |
| 2007/0170370 A1* | 7/2007 | Gorrell et al. | 250/396 R |
| 2008/0060455 A1* | 3/2008 | Coyle | 73/863.12 |

FOREIGN PATENT DOCUMENTS

WO   02/25785   3/2002

OTHER PUBLICATIONS

Andrews, H.L. et al., "Gain of a Smith-Purcell free-electron laser", Physic& Review Special Topics—Accelerators and Beams, vol. 7, Issue 7, pp. 070701-1-070701-7, Jul. 2004.
Andrews, H.L. et al., "Three-dimensional theory of the Smith-Purcell free-electron laser with side walls", Journal of Applied Physics, vol. 105, Issue 2, pp. 024904-1-024904-6, Jan. 2009.
Donohue, J.T. et al., "Dispersion relation for a three-dimensional lamellar grating", Physical Review Special Topics—Accelerators and Beams, vol. 14, Issue 6, pp. 060709-1-060709-14, Jun. 2011.
Li, D. et al., "Reduce the start current of Smith-Purcell backward wave oscillator by sidewall grating", Applied Physics Letters, vol. 91, Issue 22, pp. 221506-1-221506-2, Nov. 2007.
Liu, Wenxin et al., "Enhancements of Terahertz Radiation From a Grating Wavegude by Two-Stream Instability", IEEE Transactions on Plasma Science, vol. 36, No. 3, pp. 748-756, Jun. 2008.
Search Report for French Application No. 1158907, dated May 16, 2012.

* cited by examiner

*Primary Examiner* — Dung Nguyen
(74) *Attorney, Agent, or Firm* — Nixon Peabody LLP

(57) ABSTRACT

High-efficiency method and device, to produce coherent Smith-Purcell radiation. A conductive diffraction grating, delimited by two conductive walls, is used, and an electron beam is passed above the grating to generate the radiation. According to the invention, the speed of the electrons is sufficiently low in order that, in a diagram (wave number k, frequency f), the beam line (I) intersects a portion (V) of a branch of the dispersion relationship, located in the first Brillouin zone, and corresponding to the grating's fundamental mode, at a point (P) located outside the zone delimited by the light lines (III, IV), and the current density of the beam is sufficiently high to excite the grating's fundamental mode which is radiated towards the outside thereof.

9 Claims, 2 Drawing Sheets

HIGH-EFFICIENCY METHOD AND DEVICE, TO PRODUCE COHERENT SMITH-PURCELL RADIATION

CROSS REFERENCE TO RELATED APPLICATIONS OR PRIORITY CLAIM

This application claims the benefit of French Patent Application No. 11 58907, filed Oct. 3, 2011, the contents of which are incorporated herein by reference in their entirety.

TECHNICAL FIELD

The present invention concerns a method and a device to produce coherent Smith-Purcell radiation.

This device, if appropriate choices are made for its components and these components' appropriate settings, enables a coherent electromagnetic wave to be produced in the terahertz range, which covers 100 GHz to 10 THz, and more particularly in the low frequencies part of this range, the part which covers 100 GHz to 1 THz.

In this field, the invention essentially finds applications in the field of imaging, in particular two applications relating to security:

detection of individuals bearing weapons, and
detection of dangerous products (explosives) by spectral analysis.

STATE OF THE PRIOR ART

Terahertz radiation is non-ionising. It has many applications in the field of imaging; many materials are indeed transparent between 100 GHz and 10 THz. The interaction of such radiation with material particularly causes molecular rotation to occur. It does not propagate well in air (transmission windows exist) and its absorption in water is substantial. In addition, metals are reflective with regard to this radiation.

The simplest way of producing terahertz radiation consists in using a black body; the radiation obtained is then incoherent and has a very low power rating (of the order of a few picowatts to a few microwatts).

It is also possible to manufacture terahertz sources using non-linear diodes of the Schottky type; these enable a power rating of the order of 1 mW to be attained, but without any frequency tunability.

It is also known to manufacture coherent terahertz sources in a laboratory, having a useful power rating, but they are not suitable for industrial applications since they are bulky and expensive or unreliable.

There are in fact two families of laboratory terahertz sources: the first makes use of lasers and the second uses electrons. This second family includes sources such as free-electron lasers, which are capable of providing a power rating of 100 W in continuous-wave mode with a large accelerator, and microwave tubes.

Devices are also known which are based on Smith-Purcell radiation. On this subject, the following documents may be consulted:

[1] H. L Andrews et al, "Gain of a Smith-Purcell free-electron laser", Phys. Rev. ST Accel. Beams 7,070701 (2004)
[2] US 2006/0062258, Brau et al.

Unfortunately, these known devices are only capable of producing radiation with frequencies equal to harmonics of a fundamental frequency. And these known devices have very low levels of efficiency, of the order of 0.001.

Manufacturing a compact terahertz source of sufficient power for industrial applications is currently a challenge which is very difficult to meet. The most intensely studied terahertz systems use lasers; they are bulky, not frequency-tunable, and deliver low power ratings.

DESCRIPTION OF THE INVENTION

The aim of the present invention is to remedy the above disadvantages.

It concerns in particular a modified Smith-Purcell device in which an electron beam is passed above a diffraction grating; and the three-dimensional properties of the latter are exploited in order to emit a coherent radiation which is tunable and highly directional, with a level of efficiency not previously achieved for a compact system.

The invention is based on the three-dimensional theory of modes of a diffraction grating having side walls; and, under certain calculable conditions which can be simulated simply, it enables an electromagnetic wave to be radiated which is directly derived from the fundamental interaction mode between an electron beam and the grating.

The efficiency of a device in accordance with the invention is approximately one hundred times greater than that of a conventional Smith-Purcell device operating on the second harmonic.

In precise terms, the object of the present invention is a method of generating coherent Smith-Purcell radiation, in which:

an electrically conductive diffraction grating which is delimited laterally by two electrically conductive walls is used, and an electron beam, having determined speed and current density, is passed above the diffraction grating, between the walls delimiting the latter, with a view to producing the coherent Smith-Purcell radiation by interaction of the electron beam with the diffraction grating, characterised in that:

the speed of the electrons is sufficiently low in order that, in a dispersion diagram, where the frequency is expressed as a function of the wave number, for the grating-beam combination, a straight line called the beam line and representing the electron beam, intersects a portion of a branch of the three-dimensional dispersion relationship of the diffraction grating, located in the first Brillouin zone, and corresponding to the fundamental mode of the diffraction grating, at a point located outside the zone delimited by straight lines called respectively the forward light line and backward light line, and the current density of the electron beam is sufficiently high to excite the fundamental mode of the diffraction grating which is radiated towards the outside thereof.

According to a preferred embodiment of the method forming the object of the invention, distance W separating the walls which delimit the grating is greater than period L of the latter, and less than five times L. W may, for example, be chosen to be quite close to 2L.

According to a particular embodiment of the invention, period L of the diffraction grating, distance W separating the walls which delimit the grating, the current density of the electron beam and the speed of the electrons are determined in order that the radiation frequency be comprised in the interval 100 GHz to 1 THz.

The electron beam is preferably flat and slightly wider than the distance separating the walls which delimit the grating.

According to a preferred embodiment of the invention, the electron beam is passed at a distance D from the diffraction grating, such that D is less than $\gamma\beta\lambda/(2\pi)$, where $\beta$ is the ratio of the speed of the electrons to the speed of light in a vacuum, $\lambda$ is the wavelength of the radiation in a vacuum and $\gamma$ is equal to $(1-\beta^2)^{-1/2}$.

Another object of the present invention is a device to generate coherent Smith-Purcell radiation, including:

an electrically conductive diffraction grating which is delimited laterally by two electrically conductive walls, and a device to produce and pass an electron beam, having determined speed and current density, above the diffraction grating, between the walls which delimit the latter, with a view to producing the coherent Smith-Purcell radiation by interaction of the electron beam with the diffraction grating, characterised in that:

the speed of the electrons is sufficiently low in order that, in a dispersion diagram, where the frequency is expressed as a function of the wave number, for the grating-beam combination, a straight line called the beam line and representing the electron beam, intersects a portion of a branch of the three-dimensional dispersion relationship of the diffraction grating, located in the first Brillouin zone, and corresponding to the fundamental mode of the diffraction grating, at a point located outside the zone delimited by straight lines called respectively the forward light line and backward light line, and the current density of the electron beam is sufficiently high to excite the fundamental mode of the diffraction grating which is radiated towards the outside thereof.

The device forming the object of the invention can also include a device to focus the electron beam at a zone located above the diffraction grating and/or a device to guide the electron beam.

This guidance device is, for example, a magnetic guidance device.

BRIEF DESCRIPTION OF THE DRAWINGS

The present invention will be better understood on reading the description of example embodiments given below, purely as an indication and in no sense restrictively, making reference to the appended drawings in which.

DETAILED DESCRIPTION OF PARTICULAR EMBODIMENTS

Figure 1:
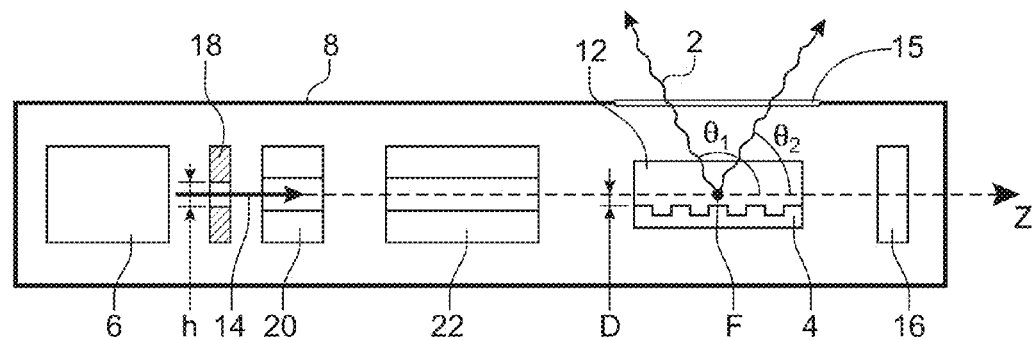
FIG. 1 is a diagrammatic lengthways section view of an example of the device which is the object of the invention.

In FIG. 1 a longitudinal section view of an example of the device forming the object of the invention is represented diagrammatically.

The device of FIG. 1 is intended to produce coherent Smith-Purcell radiation 2 with a high degree of efficiency. It includes an electrically conductive diffraction grating 4, for example a metal one, and an electron gun 6.

The latter and diffraction grating 4 are placed in a vacuum chamber 8; the means for producing the vacuum in the latter have not been represented (residual pressure: of the order of $10^{-5}$ hPa to $10^{-4}$ hPa).

Figure 2:
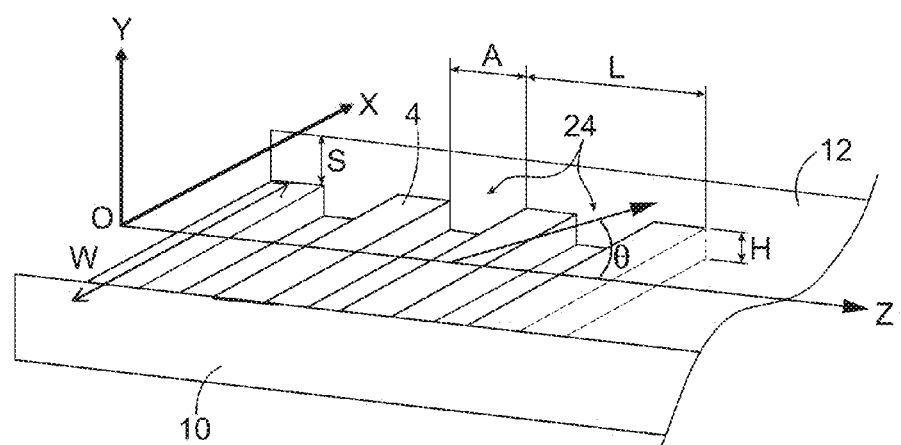
FIG. 2 is a diagrammatic perspective view of an example of a diffraction grating of a kind which may be used in the invention.

Diffraction grating 4 is represented diagrammatically from a perspective view in FIG. 2. It can be seen that it is delimited laterally by two walls 10 and 12. The latter are also electrically conductive, being made for example of metal. Only wall 12 is visible in FIG. 1.

Electron gun 6 is intended to produce an electron beam 14 which propagates along an axis Z, above diffraction grating 4, between the two walls 10 and 12. Coherent Smith-Purcell radiation 2 is produced by an interaction between this beam 14 and grating 4.

As can be seen, vacuum chamber 8 has a window 15 which is transparent to this radiation, with a view to the use of this radiation. This window is made, for example, of Plexiglas®.

A beam stop device is also installed in vacuum chamber 8, after diffraction grating 4, to stop electron beam 14.

The latter may, for example, be round in shape. But it is preferably given a flat shape, and made slightly less wide than distance W separating walls 10 and 12. By this means the interaction of electron beam 14 with diffraction grating 4 is favoured.

This flat beam is obtained, for example, using a rectangular slit 18, height h of which is very much less than its width, and which is placed perpendicularly to axis Z, after electron gun 6.

In certain cases, for example when a high-current electron beam 14 is used, it may be required for this beam to be focused at a zone F, located above the diffraction grating. An appropriate focusing device 20 is then installed, for example an electrostatic lens system, after electron gun 6 (or after slit 18, if this is present).

In addition, in certain cases, depending on the respective values of the various parameters of the device, for example in the case of a high-current electron beam, it may be necessary to guide this beam along axis Z. An appropriate guidance device 22 is then also installed, for example a magnetic guidance device, after electron gun 6 (or after slit 18, if this is present, or alternatively after focusing device 20, if this is present).

The means of control of electron gun 6 have not been represented in FIG. 1, nor those of focusing device 20, nor those of guidance device 22.

With a view to favouring the interaction of electron beam 14 with diffraction grating 4, beam 14 is passed at a distance D from grating 4, which is less than $\gamma\beta\lambda/(2\pi)$.

In this expression $\beta$ is the ratio of speed v of the electrons to the speed of light in a vacuum c; $\lambda$ is the wavelength of Smith-Purcell radiation 2 in a vacuum; and v is equal to $(1-\beta^2)^{-1/2}$.

Kinetic energy T of electron beam 14 and current I of this beam are sufficiently low for it to be possible to use, as electron gun 6, an electron gun of the type used in conventional microwave tubes.

In the invention, kinetic energy T of the electron beam is preferably between 50 keV and 100 keV and current I between 1 mA and 10 A, depending on the dimensions of the diffraction grating.

This diffraction grating has a period L and the number of periods is noted N.

Period L is chosen according to the wavelength of the desired application. Formula (1), given below, is sufficient to give the order of magnitude, before a precise calculation of the modes of the three-dimensional grating.

(It can be seen immediately that for $\beta=0.5$, $\lambda$ will vary between L and 3L depending on the value of cos θ, which varies from 1 to −1.)

Width W of the grating (distance between its two side walls) is an essential parameter of the invention. The height of these walls is noted S.

Width W is preferably such that: L<W<5L. W is chosen, for example, to be quite close to 2L.

In the invention, the grooves of the diffraction grating can have different profiles, for example a rectangular profile, a triangular profile or a sinusoid profile.

In the example of FIG. 1, a lamellar grating is used, i.e. a grating of which grooves 24, or slits, have a rectangular profile. And the thickness (respectively the depth) of grooves 24 is noted A (respectively H).

Axis Z, along which the electron beam is propagated, is perpendicular to the grooves. And, in addition, an axis X is defined which is parallel to the grooves, and therefore perpendicular to axis Z, and also to an axis Y which is perpendicular to axes X and Z, as can be seen in FIG. 2. The three axes X, Y and Z intersect one another at a point O.

It is recalled that Smith-Purcell radiation is emitted at an angle θ relative to the electron beam, according to the following relationship:

$$\lambda = c/f = L(1/\beta - \cos\theta)/|n| \quad (1)$$

where λ represents the wavelength of the radiation in a vacuum, f the frequency of this radiation, c the speed of light in a vacuum, β the ratio v/c (v: speed of the electrons) and n the diffraction order.

If the electron beam is not modulated this radiation is incoherent, and it is emitted at all angles satisfying this relationship.

Conversely, the present invention enables coherent Smith-Purcell radiation to be obtained, directly on the fundamental mode, and higher efficiency to be thus obtained.

It is stipulated that, in the invention, the case in which |n| is equal to 1 (n=−1) is considered.

The invention is based on the accurate theory of three-dimensional modes of a grating of a given width, fitted with side walls. On this subject, reference will be made to the following document:

[3] J. T Donohue and J. Gardelle, "Dispersion Relation for a Three-Dimensional Laminar Grating", Phys. Rev. ST Accel. Beams 14, 060709 (2011).

Figure 3:
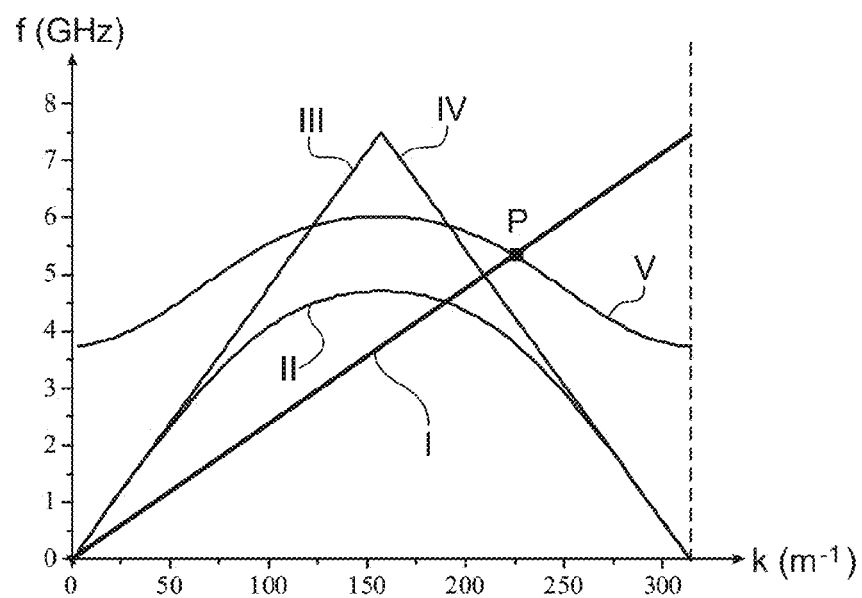
FIG. 3 is an example of a dispersion diagram enabling operating point P of the system constituted by the diffraction grating and the electron beam to be obtained.

FIG. 3 illustrates an example of the invention, in which the coherent radiation obtained is low-frequency radiation, namely radiation in the microwave range.

It shows a dispersion diagram (f, k) of the system constituted by grating 4 and beam 14, where k represents a wave number.

The corresponding parameters are given in the table below.

| Parameter | Value |
|---|---|
| Number of periods N | 30 |
| Period L | 2 cm |
| Depth of a the slit H | 1 cm |
| Thickness of the slit A | 1 cm |
| Width of the grating W | 4 cm |
| Height of the walls S | 2 cm |
| Beam energy T | 80 keV |
| Current of the beam I | 5 A |
| Thickness of the beam | 1 mm |
| Beam-grating distance D | 0.5 mm |
| Width of the beam | 3.5 cm |
| Guiding field Bz | 1 T |

It is stipulated that beam-grating distance D (FIG. 1) and height S of the walls (FIG. 2) are counted from the highest points of the grating, as can be seen in FIGS. 1 and 2. And the guidance field is a magnetic field parallel to axis Z and in the same direction as this axis.

Furthermore, it should be recalled that v may easily be found from T, and vice versa, by the following relationship:

$$T = (\gamma - 1)mc^2 \quad (2)$$

where γ is equal to $(1-\beta^2)^{-1/2}$, β is equal to v/c and m represents the mass of the electron.

In FIG. 3 only the first Brillouin zone, of length $K=(2\pi)/L$, is considered. Straight line I, the equation of which is $f=vk/(2\pi)$, represents electron beam 14 and is called the beam line. Curve II represents the dispersion relationship of grating 4 in two dimensions.

Straight lines III and IV are respectively the forward light-line, the equation of which is $f=ck/(2\pi)$, and the backward light-line.

If L is equal to 2 cm, the equation of this backward light-line is:

$$f = ck/(2\pi) \text{ if: } k \leq 50\pi$$

$$f = c(100\pi - k)/(2\pi) \text{ if: } 50\pi < k \leq 100\pi$$

for k expressed in $m^{-1}$ and f in GHz.

As can be seen, straight lines III, IV and the axis of the "k"s delimit a triangle called the "light triangle".

If the point of intersection between beam line I and the representative curve of the grating's dispersion relationship is within the light triangle, which is always the case in two dimensions, the system cannot emit on the fundamental mode. The latter is then an evanescent surface wave in direction Y. Only the harmonics of the fundamental frequency can then be emitted with a low efficiency.

Curve V represents the three-dimensional dispersion relationship of the grating fitted with side walls. Intersection point P can then be outside the light triangle; and a coherent emission on the fundamental mode is then permitted.

In the example described, point P is therefore chosen as the operating point of the beam-grating system. In other words, speed v of the electrons (or, putting it another way, kinetic energy T of the latter—see relationship (2)) is then chosen such that beam line I intersects curve V at P.

Generally, in the present invention, v (or T) is chosen to be sufficiently low in order that, in the dispersion diagram (k, f) of the grating-beam combination, the beam line intersects a portion of a branch of the dispersion relationship, located in the first Brillouin zone, and corresponding to the fundamental mode of the diffraction grating, at a point located outside the zone delimited by the light lines.

It is also stipulated that the current density of the electron beam is sufficiently high to excite the fundamental mode of the diffraction grating which is radiated towards the outside thereof.

Figure 4:
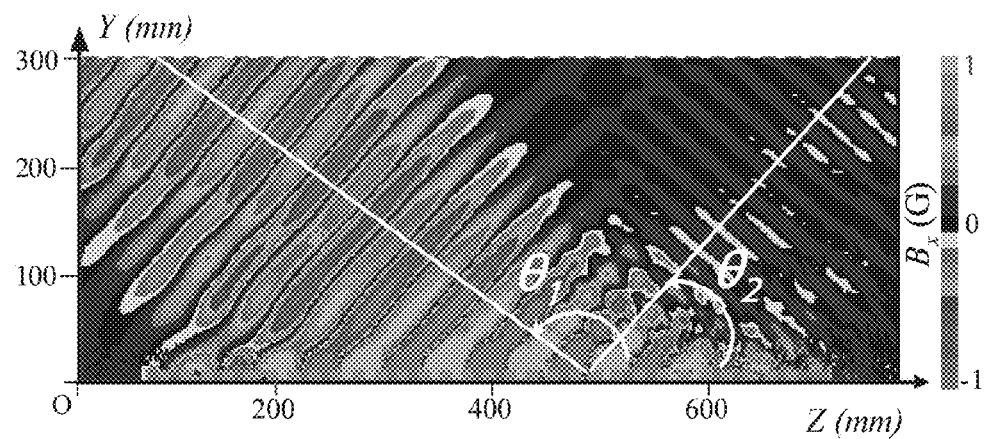
FIG. 4 shows the contour diagram, at a given instant, in plane YOZ of the frame (O, X, Y, Z) represented in FIG. 2, of the X component of the magnetic field of the radiating wave, corresponding to point P of FIG. 3.

FIG. 4 shows a contour diagram in plane YOZ at a given time (15 ns), of the component following X, noted $B_x$ and expressed in gauss (1 G=$10^{-4}$ T) of the magnetic field of the radiated electromagnetic wave.

The lobe emitted towards the rear, at angle $\theta_1$, which is close to 150° (also see FIG. 1), corresponds to a wave having the fundamental frequency; it is highly directional.

The radiation of the second harmonic can also be seen, emitted towards the front, at angle $\theta_2$, which is close to 50°. In two dimensions only this second harmonic can be emitted, with low efficiency.

A three-dimensional digital simulation was made using a commercially available PIC (Particle-In-Cell) code, called MAGIC. It gives the emitted power and the level of efficiency of the present invention.

After interaction, the electrons have lost an average energy of 10 keV. Since the current of the electron beam is equal to 5 A, its power rating, which is initially equal to 400 kW, has been reduced by 50 kW.

The area of the emission lobe corresponding to the fundamental frequency was measured. Since a magnetic field of 1 G($10^{-4}$ T) corresponds to a power density of 120 W/cm$^2$, it is deduced therefrom that a power rating of the order of 35 kW is radiated in this lobe.

As regards the power output from the simulation unit, these diagnostics give a value of approximately 60 kW. The level of efficiency of the invention is approximately 10%.

For the three-dimensional calculation, the frequency limit depends on the computation time and on the memory of the computer used to simulate a realistic high-frequency device. The time required for saturation of the beam-grating interaction depends on the current of the beam. This time is increased when the current is reduced.

At high frequency the number of mesh units used for the computation increases, since more periods are required in the grating; and the memory limit of the code or of the computer used can then be reached.

As an example, for a frequency of 20 GHz, a current of 300 mA and 90 periods, 40 ns were required to obtain saturation; and the computation took 80 hours on a standard personal computer.

In the present invention, the parameters of the diffraction grating are chosen in accordance with the radiation frequency which it is desired to obtain.

For example, a homothety on the geometry leads to a grating having some one hundred periods, a period length of 200 μm and a width of 400 μm in order to be able to operate at 500 GHz. Gratings having these characteristics have previously been manufactured.

In addition, the electron beam must have a sufficient current density to excite the fundamental mode of the diffraction grating which is radiated towards the outside thereof.

An extrapolation of the calculations made for a frequency of 5 GHz leads to a beam having a kinetic energy T of the order of 100 keV and a current I of 500 μA. Such a beam can be focused on the grating, for example using a magnetic lens system.

In the present invention, width W of the grating is an essential parameter which enables the radiation at the fundamental frequency to be obtained directly. Before the invention, the latter was purely evanescent since, firstly, only two-dimensional gratings were used, the width of which was presumed to be infinite along X and, secondly, the theory developed in three dimensions was incorrect.

The correct theory, contained in document [3], has been validated by three-dimensional simulations, made using the PIC code called MAGIC, a code which is widely distributed and reliable.

Making reference to this document [3], it is observed that frequency $f_{3D}$ of the coherent Smith-Purcell radiation, obtained by means of the invention, can be written as follows:

$$f_{3D}=(f_{2D}^2+(\alpha c/W)^2)^{1/2} \quad (3)$$

In the above relationship:

$f_{2D}$ is the frequency obtained in two dimensions, i.e. considering the width of the diffraction grating to be infinite ($f_{2D}$ and therefore $f_{3D}$ are periodic functions of wave number k, of period K=2π/L), and α is a number which takes integer or half-integer values.

It is therefore understood that width W of the diffraction grating is an important parameter: its influence on the dispersion relationship is substantial.

It should be noted that the electron beam used in the invention can be produced by a commercially available electron gun. And a device in accordance with the invention can therefore be manufactured, the volume of which is of the order of 1 m$^3$.

In addition, the possibility of directly emitting the wave derived from the fundamental mode of interaction substantially increases the interest of a coherent Smith-Purcell device. Conventional efficiency is of the order of 0.001 on the second harmonic, whereas that of the invention is several percent.

In addition, if reference is made to FIG. 4, it will be noted that the radiation obtained is highly directional. It should be recalled that emission angle θ of this radiation is given by formula (1).

In the example described making reference to FIG. 3, it will be noted that frequency f of this radiation is lower than that corresponding to the intersection of beam line I and the straight line of equation k=K=2π/L (limit of the first Brillouin zone). Frequency f is therefore less than v/L. It then follows from formula (1) that angle θ is greater than 90° (|n|=1). Making reference to FIG. 1, if it is considered that the electrons are emitted towards the front, the radiation is therefore, for its part, emitted towards the rear.

As regards the tunability of a device in accordance with the invention, it will be noted that for a given beam energy T, wavelength λ of the emitted radiation varies in linear fashion with period L of the grating.

It will also be noted that by changing energy T of the beam, and for a grating of fixed period L, frequency f of the emitted radiation can vary by approximately ±3%.

The invention claimed is:

1. A method for generating coherent Smith-Purcell radiation, in which:

an electrically conductive diffraction grating which is delimited laterally by two electrically conductive walls is used, and an electron beam, having determined speed and current density, is passed above the diffraction grating, between the walls delimiting a latter, with a view to producing the coherent Smith-Purcell radiation by interaction of the electron beam with the diffraction grating, characterised in that:

the speed of the electrons is sufficiently low in order that, in a dispersion diagram, where a frequency is expressed as a function of a wave number, for a grating-beam combination, a straight line called a beam line (I) and representing the electron beam, intersects a portion (V) of a branch of a three-dimensional dispersion relationship of the diffraction grating, located in a first Brillouin zone, and corresponding to a fundamental mode of the diffraction grating, at a point (P) located outside a zone delimited by straight lines called respectively a forward light line and backward light line (III, IV), and the current density of the electron beam is sufficiently high to excite the fundamental mode of the diffraction grating which is radiated towards an outside thereof.

2. A method according to claim 1, in which distance W separating the walls which delimit the grating is greater than period L of the latter and less than five times L.

3. A method according to claim 1, in which period L of the diffraction grating, distance W separating the walls which delimit the grating, the current density of the electron beam and the speed of the electrons are determined in order that the radiation frequency be comprised in the interval 100 GHz to 1 THz.

4. A method according to claim 1, in which the electron beam is flat and has a width which is slightly less than the distance separating the walls which delimit the grating.

5. A method according to claim 1, in which the electron beam is passed at a distance D from the diffraction grating, such that D is less than $\gamma\beta\lambda/(2\pi)$, where $\beta$ is the ratio of the speed of the electrons to the speed of light in a vacuum, $\lambda$ is the wavelength of the radiation in a vacuum and $\gamma$ is equal to $(1-\beta^2)^{-1/2}$.

6. A device for generating coherent Smith-Purcell radiation, including:
- an electrically conductive diffraction grating which is delimited laterally by two electrically conductive walls, and
- a device to produce and pass an electron beam, having determined speed and current density, above the diffraction grating, between the walls which delimit a latter, with a view to producing the coherent Smith-Purcell radiation by interaction of the electron beam with the diffraction grating, characterised in that:
- the speed of the electrons is sufficiently low in order that, in a dispersion diagram, where a frequency is expressed as a function of a wave number, for a grating-beam combination, a straight line called a beam line (I) and representing the electron beam, intersects a portion (V) of a branch of a three-dimensional dispersion relationship of the diffraction grating, located in a first Brillouin zone, and corresponding to a fundamental mode of the diffraction grating, at a point (P) located outside a zone delimited by straight lines called respectively a forward light line and backward light line (III, IV), and
- the current density of the electron beam is sufficiently high to excite the fundamental mode of the diffraction grating which is radiated towards an outside thereof.

7. A device according to claim 6, also including a device to focus the electron beam at a zone (F) located above the diffraction grating.

8. A device according to claim 6, also including a device for guiding the electron beam.

9. A device according to claim 8, in which the guidance device is a magnetic guidance device.

* * * * *